US012365137B2

(12) United States Patent
Sarmah et al.

(10) Patent No.: US 12,365,137 B2
(45) Date of Patent: Jul. 22, 2025

(54) ADDITIVE MANUFACTURING OF THERMOSETTING RESINS VIA DIRECT INK WRITING AND RADIO FREQUENCY HEATING AND CURING

(71) Applicant: The Texas A&M University System, College Station, TX (US)

(72) Inventors: Anubhav Sarmah, Bryan, TX (US); Ava Crowley, College Station, TX (US); Suchi Desai, College Station, TX (US); Gabriel Zolton, Kingwood, TX (US); Micah J. Green, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 18/072,190

(22) Filed: Nov. 30, 2022

(65) Prior Publication Data
US 2023/0173755 A1 Jun. 8, 2023

Related U.S. Application Data

(60) Provisional application No. 63/287,519, filed on Dec. 8, 2021.

(51) Int. Cl.
*B29C 64/295* (2017.01)
*B29C 64/118* (2017.01)
*B33Y 10/00* (2015.01)
*B33Y 30/00* (2015.01)
*B33Y 70/10* (2020.01)
*B29K 101/10* (2006.01)
(Continued)

(52) U.S. Cl.
CPC .......... *B29C 64/295* (2017.08); *B29C 64/118* (2017.08); *B33Y 10/00* (2014.12); *B33Y 30/00* (2014.12); *B33Y 70/10* (2020.01); *B29K 2101/10* (2013.01); *B29K 2105/162* (2013.01); *B29K 2507/04* (2013.01)

(58) Field of Classification Search
CPC ..... B29C 64/295; B29C 64/118; B33Y 10/00; B33Y 30/00; B33Y 70/10
See application file for complete search history.

(56) References Cited

U.S. PATENT DOCUMENTS

2017/0282400 A1* 10/2017 Jie ........................... B28B 1/001

FOREIGN PATENT DOCUMENTS

WO WO-2018089785 A1 * 5/2018 ........... B29C 64/118

OTHER PUBLICATIONS

Wikipedia entry for "Radio Frequency", retrieved Sep. 16, 2024 (Year: 2024).*

(Continued)

*Primary Examiner* — Galen H Hauth
*Assistant Examiner* — John Robitaille
(74) *Attorney, Agent, or Firm* — Winstead PC

(57) ABSTRACT

In an embodiment, the present disclosure pertains to a method of direct ink writing (DIW). In general, the method includes extruding a resin from a print head, applying radio frequency (RF) heating to the resin, and inducing partial curing of the extruded resin layer-by-layer to thereby form a self-supporting structure. In an additional embodiment, the present disclosure pertains to a system for DIW. In some embodiments, the system includes a print head operable to extrude a resin from a nozzle and an RF applicator.

9 Claims, 1 Drawing Sheet

(51) Int. Cl.
  *B29K 105/16*  (2006.01)
  *B29K 507/04*  (2006.01)

(56) References Cited

OTHER PUBLICATIONS

Wikipedia entry for "Radio Spectrum", retrieved Sep. 16, 2024 (Year: 2024).*

* cited by examiner

ADDITIVE MANUFACTURING OF THERMOSETTING RESINS VIA DIRECT INK WRITING AND RADIO FREQUENCY HEATING AND CURING

CROSS-REFERENCE TO RELATED APPLICATIONS

This patent application claims priority from, and incorporates by reference the entire disclosure of, U.S. Provisional Application No. 63/287,519 filed on Dec. 8, 2021.

TECHNICAL FIELD

The present disclosure relates generally to additive manufacturing and more particularly, but not by way of limitation, to additive manufacturing of thermosetting resins via extrusion-based direct ink writing and radio frequency heating and curing.

BACKGROUND

This section provides background information to facilitate a better understanding of the various embodiments of the disclosure. It should be understood that the statements in this section of this document are to be read in this light, and not as admissions of prior art.

Current methods for manufacturing thermoset parts involve printing into a mold or thixotropic bath, using novel crosslinking chemistries, viscosifying agents, and/or long curing schedules in an oven. Current manufacturing methods suffer from low throughput and high touch time. Additionally, since current methods use conventional ovens for curing, current systems and methods for thermoset part manufacturing require a large footprint. Furthermore, current methods fail to print and cure thermoset parts in situ.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a method of direct ink writing (DIW). In general, the method includes extruding a resin from a print head, applying radio frequency (RF) heating to the resin, and inducing partial curing of the extruded resin layer-by-layer to thereby form a self-supporting structure.

In an additional embodiment, the present disclosure pertains to a system for DIW. In general, the system includes a print head operable to extrude a resin from a nozzle and an RF applicator.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

DIW is an additive manufacturing method where a liquid-phase print medium is extruded out of a nozzle along a digitally defined path. Disclosed herein is a method of and a system for the use of DIW printing coupled with a co-planar radio frequency (RF) applicator to rapidly heat and in situ cure nano-filled composite resins. In this approach, a layer-by-layer, print-and-cure cycle is used to manufacture thermoset parts. Conventional methods for additive manufacturing with thermosets rely on the use of viscosifiers, novel crosslinking chemistries, and/or long curing schedules in an oven. In contrast, the methods of the present disclosure use commercially available resins, and the use of RF heating negates the need for an oven or post processing step.

Figure 1A:
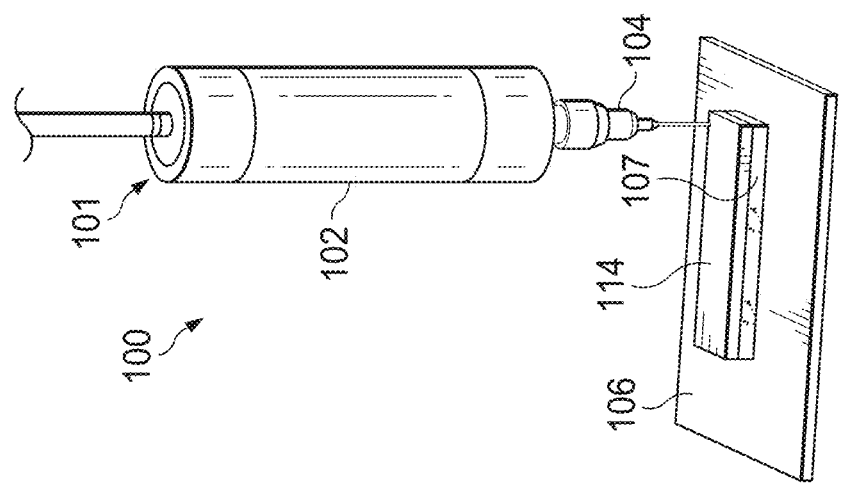
FIGS. 1A-1C illustrate a method of and a system for layer-by-layer, print-and-cure cycle additive manufacturing according to embodiments of the present disclosure.
Figure 1B:
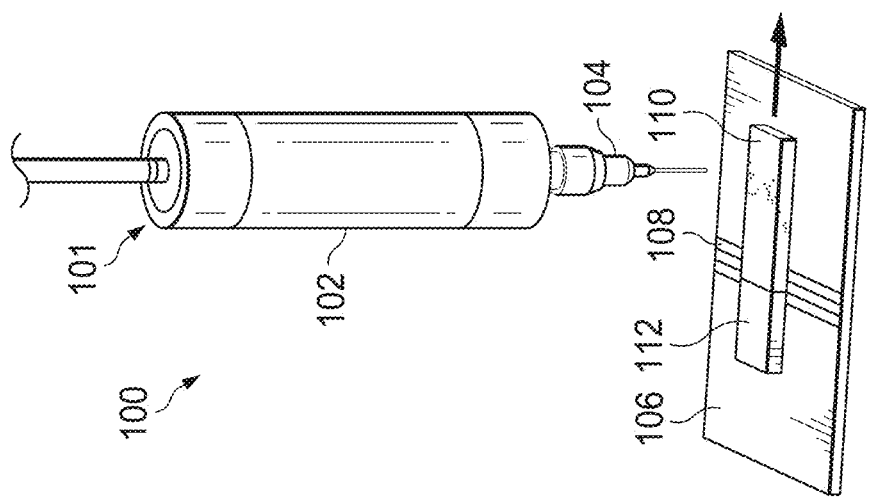
Figure 1C:
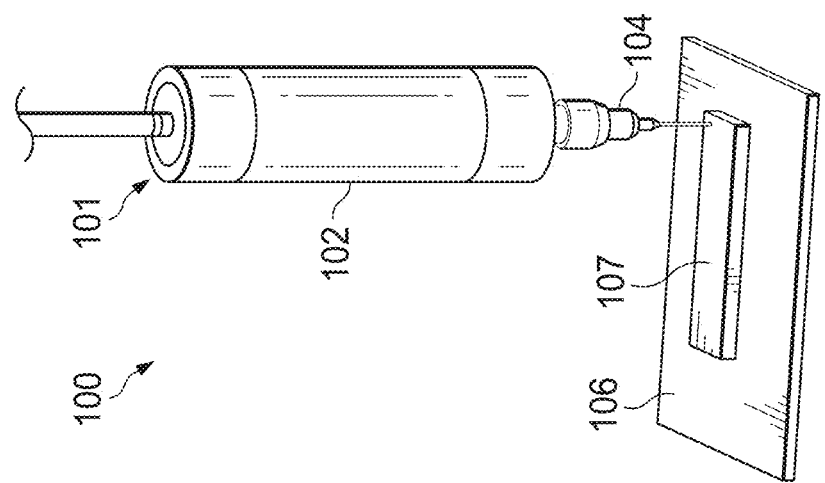

The methods disclosed herein involve the use of a DIW printer and an RF applicator. Resin material is DIW printed onto a substrate and partially cured using RF heating. Following this, the next layer is deposited and the process repeats. This process allows the creation of high-resolution, multi-layer structures that do not buckle under their own weight. FIGS. 1A-1C illustrate a method 100 of layer-by-layer, print-and-cure cycle additive manufacturing according to embodiments of the present disclosure. Such processes can be used to make, for example, thermoset parts, and the use of RF heating to cure DIW printed thermosets has not been done before.

Method 100 makes use of a DIW system 101 that includes a print head 102 with a nozzle 104. In a first step, method 100 includes feeding a thermoset material (e.g., a resin or epoxy) to print head 102 of the DIW system and extruding the thermoset material through nozzle 104 onto a work surface 106 to form a first layer 107 having a desired shape (see FIG. 1A). In some embodiments, the desired shape is formed by moving work surface 106 relative to print head 102. In some embodiments, the desired shape is formed by moving print head 102 relative to work surface 106. In some embodiments, the desired shape is formed by moving both print head 102 and work surface 106.

In a second step, method 100 includes subjecting the extruded thermoset material to an RF field via an RF applicator 108. The RF field can be applied to the thermoset material through a non-contact applicator positioned beneath or above the thermoset material. FIG. 1B illustrates RF applicator 108 as a co-planar RF applicator that is positioned beneath the extruded thermoset material. In FIG. 1B, a first portion 110 of first layer 107 has already passed by RF applicator 108 and is partially cured by the RF field. A second portion 112 has not yet passed by RF applicator 108 and is uncured. The RF field can be generated using fringing fields, parallel metal plates, traces, or lines set up as a capacitor (with fairly low spacing between the plates, traces or lines on the order of millimeters). In FIG. 1B, RF applicator 108 includes parallel metal traces. The extruded thermoset material is placed in the RF field just above the traces. The proximity of the sample is typically on the order of millimeters. The RF field causes Joule heating in a resistive material (e.g., carbon nanotubes) within the thermoset material. This heat is conducted from the resistive material to the thermoset material, speeding up the curing process. In some embodiments, the RF field is applied through at least one of direct current or alternating current. In some embodiments, the RF field has a frequency in a range between 75 to 125 MHz.

In a third step, method 100 includes applying a second layer 114 of thermoset material in an additive fashion to first layer 107 (see FIG. 1C). From the third step, method 100 repeats the second step to cure the second layer. Steps 2 and 3 may be iterated as needed to build up the desired structure.

The systems and methods as disclosed herein can be used in industrial settings to create custom parts that are manufactured with increased throughput and decreased touch time relative to traditional part manufacturing. Additionally, since these methods do not use ovens for curing, the systems and methods of the present disclosure save space as they do not require the footprint of conventional ovens. Furthermore, in the systems and methods disclosed herein, the printing and curing steps can be done in situ.

Current methods for manufacturing thermoset parts involve printing into a mold or thixotropic bath, using novel crosslinking chemistries, viscosifying agents, and/or long curing schedules in an oven. The systems and methods as disclosed herein provide an alternative curing method that reduces touch times and increase throughput associated with manufacturing thermoset parts. It is further envisioned to extend the use of this method to produce complex printed shapes, and that additionally, the creation of a two-dimensional (2D) simulation that models conversion as a function of layer number will help in identifying a conversion/partial curing that is sufficient to prevent structural collapse of multi-layered prints.

The systems and methods of the present disclosure can have various advantages. For instance, existing techniques all rely on altering the viscosity, whereas the techniques of the present disclosure do not. Additionally, existing techniques use dual cure to add some light sensitive crosslinker, whereas the systems and methods of the present disclosure makes that unnecessary. Furthermore, the systems and methods of the present disclosure can easily be applied to existing filled epoxy resins of interest.

In some embodiments, the method further includes rapid and localized heating of the resin based, at least in part, on cross-linking thermoset RF response. In some embodiments, the cross-linking thermoset RF response is a function of components in the resin. In some embodiments, the components include conductive carbon nanotubes. In some embodiments, the partial curing forms a stabilized structure that does not collapse under its weight or lose resolution. Resolution can be defined as the qualitative visual comparison between the printed part and the original design file, and is a metric for precision of material deposition. In some embodiments, the method further includes bonding subsequent layers on top of a bottom layer formed via the partial curing and promoting inter-layer adhesion in the self-supporting structure. In some embodiments, the self-supporting structure is a multi-layered structure mechanically strong and load bearing. In some embodiments, the RF heating is induced in situ via an RF applicator below the resin. In some embodiments, the RF heating is induced in situ via an RF applicator above the resin.

In some embodiments, the RF applicator is at a position below the resin after extrusion from the print head. In some embodiments, the RF applicator is at a position above the resin after extrusion from the print head. In some embodiments, the resin includes components to increase cross-linking thermoset RF response. In some embodiments, the components include conductive carbon nanotubes. In some embodiments, the increased cross-linking thermoset RF heating response results in rapid and localized heating of the resin. In some embodiments, the RF applicator is configured to partially cure a stabilized structure that does not collapse under its weight or lose shape resolution. In some embodiments, the RF applicator is configured to allow for bonding of subsequent layers on top of a bottom layer formed via partial curing of the resin. In some embodiments, the subsequent layers promote inter-layer adhesion to form a self-supporting structure. In some embodiments, the self-supporting structure is a multi-layered structure mechanically strong and load bearing. In some embodiments, the RF applicator has a variable lateral speed to adjust time and temperature of curing within the system.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the embodiments of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A system for direct ink writing (DIW), the system comprising:
    a print head operable to extrude a resin from a nozzle; and
    a co-planar radio frequency (RF) applicator, wherein the co-planar radio frequency applicator is a non-contact applicator that is located at a position below the extruded resin.

2. The system of claim 1, wherein the resin comprises components to increase a cross-linking thermoset RF response in the resin.

3. The system of claim 2, wherein the components comprise conductive carbon nanotubes.

4. The system of claim 2, wherein the increased cross-linking thermoset RF heating response results in rapid and localized heating of the resin.

5. The system of claim 1, wherein the RF applicator is configured to partially cure a stabilized structure that does not collapse under its own weight or lose shape resolution.

6. The system of claim 1, wherein the RF applicator is configured to allow for bonding of subsequent layers on top of a bottom layer formed via partial curing of the resin.

7. The system of claim 6, wherein the subsequent layers promote inter-layer adhesion to form a self-supporting structure.

8. The system of claim 1, wherein the RF applicator has a variable lateral speed to adjust time and temperature of curing within the system.

9. The system of claim 1, wherein the co-planar RF applicator comprises one of parallel metal plates and parallel traces.

\* \* \* \* \*